(12) United States Patent
Thai et al.

(10) Patent No.: US 6,465,531 B1
(45) Date of Patent: Oct. 15, 2002

(54) METHOD FOR RECYCLING THERMOSET RESIN MATERIALS

(75) Inventors: Cao Minh Thai; Takeshi Gotanda, both of Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/661,316

(22) Filed: Sep. 13, 2000

(51) Int. Cl.$^7$ ................................................ C08J 11/04
(52) U.S. Cl. ........................ 521/40; 521/47.5; 521/48
(58) Field of Search ........................................... 521/40

(56) References Cited

U.S. PATENT DOCUMENTS

| | | | | |
|---|---|---|---|---|
| 4,552,933 A | | 11/1985 | Sellstrom et al. | |
| 5,620,665 A | * | 4/1997 | Kubota | 422/135 |
| 5,776,989 A | | 7/1998 | Kubota et al. | |
| 5,859,167 A | * | 1/1999 | Yang | 528/73 |
| 5,958,988 A | * | 9/1999 | Matsushita | 521/49 |

FOREIGN PATENT DOCUMENTS

| WO | WO 97/16112 | 5/1996 |
|---|---|---|

OTHER PUBLICATIONS

S. Xue, et al., Journal of Applied Polymer Science, vol. 56, No. 2, pp. 127–134, "Preparation of Epoxy Hardeners from Waste Rigid Polyurethane Foam and Their Application," Apr. 11, 1995.

Patent Abstracts of Japan, vol. 1995, No. 07, Aug. 31, 1995, JP 07 090056, Apr. 4, 1995.

* cited by examiner

*Primary Examiner*—Paul R. Michl
(74) *Attorney, Agent, or Firm*—Oblon, Spivak, McClelland, Maier & Neustadt, P.C.

(57) ABSTRACT

A method of recycling a thermoset resin is provided, which involves contacting at least a portion of the thermoset resin with a decomposer having at least one functional group capable of reacting at a crosslink site on the thermoset resin, under conditions sufficient to break the crosslink site, to give a fluid thermoset preresin, wherein a plurality of chain ends of the preresin have functional groups thereon; and re-hardening the fluid thermoset preresin by reacting the plurality of chain ends with a rehardener having two or more groups reactive with the chain end functional groups.

34 Claims, No Drawings

METHOD FOR RECYCLING THERMOSET RESIN MATERIALS

BACKGROUND OF THE INVENTION

1. Field of the Invention

The present invention relates to a method for recycling thermoset resin materials, through which the recycling of difficult to reuse thermoset plastics is made easy.

2. Discussion of the Background

Recently, space for burying wastes is not easily obtained particularly in cities and surrounding areas. It is therefore urgent to quickly solve the problem of how to dispose of general wastes and industrial wastes. Accordingly, development in the reuse and reclamation of wastes is an important matter.

Particularly, thermoset resins such as epoxy resins, phenolic resins, unsaturated polyester resins and the like are not melted by heat once they are hardened, and reuse thereof as a resin material is difficult. Currently, they are usually buried or burned for disposal. Disposal by burial of the thermoset plastic waste is not only a problem form the aspect of land acquisition, but is also a problem from the viewpoint of fear of pollution of soil and ground water with heavy metals such as antimony and the like, and which are often used as catalysts, flame retardants and the like. On the other hand, in burning disposal, there are other problems of generation of dioxin and of disposal of a large amount of remaining ash due to fillers which are contained in the resin.

As described above, in the conventional technique, recycling of thermoset plastics has been difficult, and the wastes thereof have to be subjected to disposal while causing a lot of problems.

SUMMARY OF THE INVENTION

Accordingly, one object of the present invention is to provide a method for recycling thermoset resin that avoids the above problems and is convenient and simple to perform.

A further object of the present invention is to provide a method for recycling thermoset resin that provides a resin product suitable for a wide variety of uses.

A further object of the present invention is to provide a recycled thermoset resin.

These and other objects of the present invention have been satisfied by the discovery of a method of recycling a thermoset resin, comprising:

contacting at least a portion of the thermoset resin with a decomposer having at least one functional group capable of reacting at a crosslink site on the thermoset resin, under conditions sufficient to break said crosslink site, to give a fluid thermoset preresin, wherein a plurality of chain ends of said preresin have functional groups thereon; and re-hardening said fluid thermoset preresin by reacting said plurality of chain ends with a rehardener having two or more groups reactive with said chain end functional groups, and the recycled thermoset resin obtained thereby.

DETAILED DESCRIPTION OF THE PREFERRED EMBODIMENTS

The present invention further relates to a method of recycling a thermoset resin, comprising:

contacting at least a portion of the thermoset resin with a decomposer having at least one functional group capable of reacting at a crosslink site on the thermoset resin, under conditions sufficient to break said crosslink site, to give a fluid thermoset preresin, wherein a plurality of chain ends of said preresin have functional groups thereon; and re-hardening said fluid thermoset preresin by reacting said plurality of chain ends with a rehardener having two or more groups reactive with said chain end functional groups.

In the above method, at least the surface of the thermoset resin is decomposed and liquefied in the contacting step by the addition of the decomposer.

The recycling method may further comprise, before the contacting step, the step of breaking the thermoset resin into particles. The thermoset resin at the contacting step is partially plasticized by controlling the amount of the decomposer compound added to the thermoset resin. Within the context of the present invention the term "fluid thermoset preresin" defines the resulting composition obtained by action of the decomposer on the thermoset resin, which results in at least a partial plasticization, or liquification, of at least a portion of the surface of the resin particles. The liquification can be partial or complete in this step.

In the above method, the decomposer compound breaks the network structure of the thermoset resin to bond or associate with the broken network structure, and the re-hardener reacts with both of the decomposer compound and the resin to form a bond.

The re-hardener may be added so that the ratio of the re-hardener to the decomposer by the epoxy equivalent amount is from approximately 0.6 to 1.1.

Thermoset plastics or resins, i.e. thermally hardened products of thermosetting resins, are polymer materials having a so-called network structure in which molecules are three-dimensionally bonded, and examples thereof include cured epoxy resins, phenolic resins, polyurethane resins, melamine resins, urea resins, unsaturated polyester resins, silicone resins, xylene resins, firan resins, melamine phenol resins, polybutadiene resins and the like. Such thermoset resins are obtained by, for example, allowing a hardener to act on a prepolymer resin, or polycondensing two kinds of polymerizable compounds using a catalyst, or by other like methods. More specifically, in the case of an epoxy resin, a hardener which is generally used for epoxy resin, such as an acid anhydride, a phenolic resin, an imidazole compound, a polyamino compound and the like, is added to a prepolymer having two or more epoxy groups such that is typified by a prepolymer produced from bisphenol A and epichlorohydrin, and the obtained mixture is cured at a normal temperature or a raised temperature to prepare a hardened resin product. Since the hardener molecule is three-dimensionally bonded to the prepolymer molecules to form a steric network structure with crosslinkage, relative movement and deformation of the prepolymer chains are suppressed in the hardened resin. As a result, the cured resin is not melted even in heating at higher temperature, and, if reaching the decomposition temperature, it is decomposed and gasified. As described above, the thermosetting property of a resin is due to formation of a network structure with molecules, and this matter is generally common to thermosetting plastics.

In order to make possible the recycle of a thermoset resin material, it is necessary to realize that, first, a three-dimensionally bonded network structure of the thermoset resin material is once cut to plasticize the hard resin material, and secondly, the cut molecular chains of the resin are then bonded again to reproduce a three-dimensional network. Accordingly, the present invention comprises, for realizing recycle of a thermoset resin by chemical measures, a contacting step in which a decomposer is allowed to act on the thermoset resin material to dissociate the network structure of the thermoset resin material, and a re-hardening step in which a network structure is formed again by allowing a re-hardener to act on the decomposed resin material obtained in the contacting step and form a bond. In accordance with the above-described construction, a thermoset resin article can be reclaimed into another thermoset resin product by subjecting the decomposed resin material to a re-hardening treatment in the re-hardening step, while an appropriate molding treatment is carried out. Therefore, recycling of used or discarded products of thermoset resin becomes possible.

Here it should be noted that, in a conventional case, the re-hardening of decomposed resin which is caused by the re-hardener is not accomplished in the presence of the decomposer in the resin decomposed material, because the effect of the decomposer and that of the re-hardener counteract each other and the re-hardener does not substantially work under such conditions. In this case, it is naturally necessary, for re-hardening the decomposed resin material, to remove the decomposer before the re-hardening step from the decomposed resin material. However, the removal of decomposer is practically troublesome, and complete removal thereof is in fact difficult.

In contrast, the recycling method of the present invention has an advantage in connection with the above that re-hardening of the decomposed resin material is possible in the presence of the decomposer, and has a feature that the decomposer and the re-hardener are adopted in specific combination for realizing this advantage. Specifically, the decomposer and the re-hardener are so selected that the re-hardener is capable of acting not only on the decomposed resin material but also on the decomposer to make a bond. By satisfying this selection requirement, re-hardening of the resin decomposed material owing to the re-hardener is possible without removing the decomposer from the resin decomposed material. Such a combination of the decomposer and the re-hardener can be selected, for example, from combined compounds in which one is a resin and the other is a hardener for that resin.

The decomposer of the present invention is a compound having at least one functional group capable of reacting at a crosslink site on the thermoset resin, under conditions sufficient to break the crosslink bond and provide a fluid thermoset preresin having functional groups on a plurality of its chain ends. The decomposer is preferably a compound selected from monoamines, diamines, triamines, polyamines, alcohols, diols, triols, polyols and alcoholamines, more preferably a compound selected from benzyldimethylamine, ethylenediamine, diethylenetriamine, dipropylenetriamine, triethylenetetramine, tetraethylenepentamine, hexamethylenediamine, trimethylhexamethylenediamine, bis(hexamethylene) triamine, polyoxypropylenediamine, 3,3'-dimethyl-4,4'-diaminodicyclohexylmethane, 4,4'-diaminodiclehexylmethane, isophoronediamine, 1,3-bis(aminomethyl)cyclohexane, N-dimethylcyclohexylarnine, xylylenediamine, benzyldimethylamine, 2-(dimethylaminomethyl)phenol, 2,4,6-tris(dimethylaminomethyl)phenol, triethanolamine, ethylene glycol, propylene glycol, butylene glycol, pyridine and imidazole. Most preferably, the decomposer for epoxy thermoset resins, a preferred embodiment of thermoset resin for recycling, is diethylenetriamine, triethylenetetramine or xylylenediamine.

The rehardener of the present invention is a compound having two or more groups reactive with the functional groups present on the liquid thermoset preresin, regardless of whether the functional groups originate in the thermoset resin or in the decomposer. For the re-hardener for hardening the decomposed epoxy resin material, a compound having two or more epoxy groups can be advantageously utilized, and examples thereof include epoxy prepolymers such as bisphenol A epoxy resins, bisphenol F epoxy resins, bisphenol AD epoxy resins, biphenyl epoxy resins, alicyclic epoxy resin, cresol novolak epoxy resins, polyfunctional epoxy resins and the like. Examples of available articles of such compounds include bisphenol A epoxy resin articles sold by the trade name of EP828, EP1001 or EP1004 (manufactured by Yuka Shell Epoxy Co. of Japan), bisphenol A epoxy resin articles sold by the trade name of CT200 (manufactured by Asahi Chiba Co. of Japan), bisphenol F epoxy resin articles sold by the trade name of EP807 (manufactured by Yuka Shell Epoxy Co.), biphenyl epoxy resin articles sold by the trade name of YX4000 (manufactured by Yuka Shell Epoxy Co.), alicyclic epoxy resin articles sold by the trade name of CY175 or CY2021 (manufactured by Asahi Chiba Co.) and the like. At the step of re-hardening the decomposed epoxy resin material, heat is not particularly necessary, and in general, the decomposed epoxy resin material is sufficiently hardened at room temperature by allowing the mixture of the decomposed material and the re-hardener to stand still for about 30 to 300 minutes. The hardening speed increases at increased temperature.

The amount of re-hardener used may advantageously be changed so that the reclaimed resin material has suitable properties for use in recycling. If the control of quality of the reclaimed resin material is particularly important, the supplying amounts of the decomposer and the re-hardener are determined by using the epoxy equivalent amount of the re-hardener that is calculated relative to the amino group of the decomposer, in order to accurately adjust the supplying ratio. In general, it is preferable to add the re-hardener at a supplying ratio such that the ratio of the re-hardener to the decomposer by the epoxy equivalent amount is from about 0.6 to 1.1.

For example, in a case where the thermoset resin to be recycled is an acid anhydride cured epoxy resin (an epoxy resin hardened by using an acid anhydride), an amino compound can be used as the decomposer, and a compound having two or more epoxy groups (hereinafter, referred to as a polyepoxy compound) can be used as the re-hardener. The network structure of the cured epoxy resin material can also be decomposed by using sulfuric acid, hydrogen peroxide, alkali metal hydroxide, vapor under high temperature and high pressure, or the like. However, in a case of using one of them as a decomposer, any substance has not been found that is effective as a re-hardener for the decomposed epoxy resin material in the co-existence with the decomposer.

Since the kind of bonds which form the network structure in the cured resin material differs depending on the kind of thermosetting resin, a suitable selection of the decomposer and the re-hardener may vary depending on the resin to be recycled. However, if the same decomposer works on different kinds of thermoset resins, it must be possible for each of those resins to undergo re-hardening of the decomposed resin by means of the same re-hardener that can be used in combination with that decomposer.

For example, an amino compound can be applied not only to an acid anhydride hardened epoxy resin but also to a polyurethane resin and unsaturated polyester resin. Then a polyepoxy compound can be used as a re-hardener for these resins. Therefore, if a waste material of a thermoset resin to be recycled contains at least one or more of an acid anhydride hardened epoxy resin, polyurethane resin or unsaturated polyester resin, an amino compound can be used as the decomposer and a polyepoxy compound can be used as the re-hardener.

Moreover, the above-mentioned combination of a decomposer and a re-hardener can be used for other thermoset resins to reclaim a thermoset resin material as well, in the same manner as for the above-mentioned epoxy resin. The re-hardener and the decomposer mutually react and form a network structure again in the resin decomposed material even in the presence of a decomposer, resulting in getting rehardening of the resin.

Among various thermoset resins, a preferred resin that can be most efficiently recycled using the above-mentioned amino compound and polyepoxy compound as a decomposer and a re-hardener is an epoxy resin, particularly, an anhydride cured epoxy resin. An anhydride cured epoxy resin is obtained by hardening an epoxy resin (prepolymer) using as the hardener an acid anhydride, namely, a compound having a —CO—O—CO— group. Examples of such acid anhydrides usable as the hardener include compounds such as phthalic anhydride, hexahydrophthalic anhydride, methylnadic anhydride and the like.

As described above, the amino compound has a function to decompose the network structure of the cured epoxy resin material, and, if the amino compound is allowed to act as a decomposer on the cured epoxy resin material, the cured epoxy resin material is decomposed and plasticized (softened or liquefied). In this time, the amino compound is bonded or associated with the cut molecular chain of the decomposed epoxy resin material. If a polyepoxy compound (a compound having two or more epoxy groups) is added as a re-hardener to this decomposed and plasticized epoxy resin material and allowed to act on it, the polyepoxy compound reacts with the above-mentioned amino compound to form a bond therebetween. At the same time, a bonding reaction of the decomposed epoxy resin material with the polyepoxy compound is caused, resulting in re-hardening of the decomposed epoxy resin material.

As described above, a waste, thermoset resin material can be reclaimed into another thermoset resin product via a simple treatment process, and the re hardened resin has a strong network structure and excellent physical properties. In addition, since removal and purification operations such as removal of a decomposer from the plasticized resin material can be omitted, the recycling process is simple and treatment cost is low.

The decomposer and the re-hardener in the present invention should not be restricted to a specific example, and they may be appropriately selected within a scope in which the above-mentioned requirement is satisfied, depending on the kind of the thermoset resin to be recycled and the application and intention of use of the reclaimed resin. Namely, a combination of a decomposer and a re-hardener is selected such that the re-hardener reacts with the decomposer to form a bond. For efficiently conducting the decomposition, such a decomposer is preferably in a liquid state at normal temperature and has a boiling point higher than the glass transition temperature of the resin to be recycled. When the boiling point of the decomposer is higher than the glass transition temperature of the resin to be recycled, the treating temperature in the decomposition step is preferably set at a temperature not lower than the glass transition temperature of the resin. Therefore, the decomposition of the resin progresses rapidly and the decomposition efficiency can be raised.

Now, details of the present recycling process will be provided for the case where the thermoset resin is an acid anhydride hardened epoxy resin.

At the contacting step, an amino compound is added as the decomposer to the thermoset epoxy resin material for progressing the decomposition reaction. As the amino compound used as the decomposer, any of aliphatic amino compounds and aromatic amino compounds can be used, including but not limited to, benzyldimethylamine, ethylenediamine, diethylenetriamine, dipropylenetriamine, triethylenetetramlne, tetraethylenepentamine, hexamethylenediamine, trimethylhexamethylenediamine, bis(hexamethylene)triamine, polyoxypropylenediamine, 3,3'-dimethyl-4,4'-diaminodicyclohexylmethane, 4,4'-diaminodicyclohexylmethane, isophoronediamine, 1,3-bis(aminomethyl)cyclohexane, N-cimethylcyclohexylamine, xylylenediamine, benzyldimethylamine, 2-(dimethylaminomethyl)phenol, 2,4,6-tris(dimethylaminomethyl)phenol, triethanolamine, pyridine, imidazole and the like, and particularly, secondary amines such as diethylenetriamine, triethylenetetramine, xylylenediamine and the like are preferable. Xylylenediamine is most preferred. A secondary amine reacts advantageously with a polyepoxy compound used as the re-hardener to form a suitable hardened material. Xylylenediamine has a merit that the boiling point thereof is higher than the glass transition temperature of a normal epoxy resin and can be used for treatment of various thermoset epoxy resin materials.

Here, it is to be noted that the above-mentioned amino compound can be used as a decomposer for general thermoset resins. However, it is necessary to change the reaction conditions (treating temperature, amount of decomposer, decomposition time) depending on the resin.

The resin to be recycled may also be broken into appropriate dimensions of granulate before the contacting step. If the thermoset resin material to be recycled is cut into particles of suitable size, the decomposer possibly works on the hard resin material with high efficiency and the resin material is decomposed rapidly. Moreover, in a case where a metal matter such as aluminum, copper and the like adheres to the resin to be recycled, it is also useful for accelerating peeling from the metal matter to subject the resin to ultrasonic treatment during the decomposition step with the decomposer.

If the thermoset resin material to be recycled is heated at the contacting step, the decomposition reaction is promoted. For example, in a case where an amino compound is used in an amount of about 100% by weight to the amount of the thermoset epoxy resin material to be recycled, decomposition into a viscous liquid material is usually possible through a treating time of about a few hours if the epoxy resin material is heated at about 100° C., and of about 1 hour if the epoxy resin material is heated at about 150° C. Even at around room temperature, the decomposition reaction progresses. However, the decomposition speed is significantly reduced.

At the contacting step, the resin material can also be continuously treated by using an apparatus such as a single screw extruder, twin screw extruder and the like.

The decomposed resin material after subjecting to the decomposition treatment is hardened again by addition of a re-hardener and simultaneously molded into a product form. The molding can be performed using conventional molding techniques.

For improving properties of the reclaimed resin obtained after the re-hardening step, it is also useful to mix a metal or non-metal inorganic filler, organic filler, coloring agent, flame retardant, releasing agent, stress-lowering agent and the like with the decomposed resin material before re-hardening. Moreover, it is also possible to add other kind of resin to the decomposed resin material before the re-hardening, as necessity arises, for improvement of the reclaimed product. Alternatively, the property of reclaimed resin may also be improved by subjecting the decomposed resin material to purification such that a specific component or a solid matter such as a filler and the like contained in the thermoset resin is removed from it.

Recycling of thermoset resin is possible even when the thermoset resin is not so decomposed as to produce a completely liquid material at the decomposition step, and a reclaimed resin material suitable for recycling can also be obtained by re-hardening a partially decomposed resin material. For example, if a thermoset resin material to be recycled is broken into small particles, it is possible to obtain a molded article of the reclaimed resin material by: decomposing only the surface of the resin particles; and re-hardening the partially decomposed resin particles with the re-hardener and simultaneously charging them into a metal mold or the like having a desired product form, whereby the surfaces of the resin particles are mutually adhered before the hardening is completed. In this case, if necessary, the resin particles in the mold may also be compressed. The reclaimed resin obtained in this manner possibly has a structure containing a phase of the resin composition before decomposition and a phase of the resin composition obtained after re-hardening. In view of the above, it is therefore advantageous that the decomposition degree is set in accordance with the properties required for the reclaimed resin material, and that the particle size of the broken thermoset resin, the amount of the decomposer used in the contacting step and the decomposition temperature of the thermoset resin are appropriately controlled in accordance with the desired extent of decomposition of the resin hardened material. In the case of preparing partially decomposed resin particles, it is preferred to break the thermoset resin into particles having a particle size of about 0.05 mm or more and control the supply ratio of the decomposer to the resin particles within a range of 0.1 to 10% by weight.

It is unnecessary for recycling the thermoset resin material to continuously conduct the decomposing step and the re-hardening step. In other words, it is possible to conduct these steps in series or at a certain interval therebetween, as occasion arises. Therefore, it is permissible that, after the contacting step is conducted, the decomposed resin material is transferred to another place before conducting the re-hardening step. Moreover, it is also possible that the decomposed resin material before hardening is provided in the market as a raw material for producing a reclaimed resin article and that the purchaser carries out the rehardening treatment of the decomposed resin material.

EXAMPLES

Below, the present invention will be illustrated in detail, referring to the following examples.

Example 1

To 100 g of bisphenol A epoxy prepolymer (manufactured by Shell Chemical Co. and sold by the trade name of EP828) were added 85 g of a hardener (manufactured by Shin Nippon Rika Co. of Japan and sold by the trade name of MH700) for methylhexahydrophthalic anhydride and 0.5 g of BDMA (benzyldimethylamine) as a catalyst, and the mixture was heated at 120° C. for 10 hours for conducting hardening to produce a thermoset epoxy resin plate having a thickness of 2 mm. The glass transition temperature of this epoxy resin plate was measured by the DSC (Differential Scanning Calorimeter), and the result was 130° C.

The thermoset epoxy resin plate obtained in the above-described procedure was broken into particles which were passed through a sieve of 80 mesh to obtain a minus sieve fraction of epoxy resin particles. This fraction of epoxy resin particles (100 g) was charged into a flask, and 100 g of ethylenediamine (boiling point: 116 to 117° C.) was added to the epoxy resin particles to mix them. The mixture was heated at 117° C. for 5 hours while stirring. Then the decomposition of the epoxy resin progressed with time, and, as a result, a liquid presenting the appearance of being transparent was obtained.

A 5 g portion of the liquid obtained above was placed into a dish. To this liquid added was 20 g of a bisphenol A epoxy prepolymer (manufactured by Shell Chemical Co. and sold by the trade name of EP828), and these were mixed), followed by leaving the mixture at room temperature. About 30 minutes after, the liquid in the dish had been hardened. The glass transition temperature of this hardened material was measured by the DSC, and the result of measurement was then 120° C. The hardened material exhibited complete resinification.

Example 2

To 100 g of bisphenol A epoxy prepolymer (manufactured by Shell Chemical Co. and sold by the trade name of EP828) added were 85 g of a hardener (manufactured by Shin Nippon Rika Co. and sold by the trade name of MH700) for methylhexahydrophthalic anhydride and 0.5 g of BDMA (benzyldimethylamine) as a catalyst, and the mixture was heated at 120° C. for 10 hours for conducting hardening to produce a thermoset epoxy resin plate having a thickness of 2 mm. The glass transition temperature of this epoxy resin plate was measured by the DSC, and the result was 130° C.

The thermoset epoxy resin plate obtained in the above-described procedure was broken into particles which were passed through a sieve of 80 mesh to obtain a minus sieve fraction of epoxy resin particles. This fraction of epoxy resin particles (100 g) was charged into a flask, and 100 g of xylylenediamine (boiling point: 160° C.–) was added to the epoxy resin particles to mix them. The mixture was heated at 150° C. for 45 minutes while stirring. Then the decomposition of the epoxy resin progressed with time, and, as a result, a liquid presenting the appearance of being transparent was obtained.

A 5 g portion of the liquid obtained above was placed into a dish. To this liquid added was 20 g of a bisphenol A epoxy prepolymer (manufactured by Yuka Shell Epoxy Co. and sold by the trade name of EP828), and these were mixed sufficiently, followed by leaving the mixture at room temperature. About 30 minutes after, the liquid in the dish had been hardened. The glass transition temperature of this hardened material was measured by the DSC, and the result of measurement was then 115° C. The hardened material exhibited complete resinification.

Example 3

To 100 g of bisphenol A epoxy prepolymer (manufactured by Yuka Shell Epoxy Co. and sold by the trade name of EP807) added were 90 g of a hardener (manufactured by Hitachi Chemical Co., Ltd. of Japan and sold by the trade name of HN2200) for methyltetrahydrophthalic anhydride, 300 g of silica (manufactured by Tatsumori Ltd. and sold by the trade name of Al) as a filler, and 0.5 g of BDMA as a catalyst, and the mixture was heated at 120° C. for 10 hours for conducting hardening to produce a thermoset epoxy resin plate having a thickness of 2 mm. The glass transition temperature of this epoxy resin plate was measured by the DSC, and the result was 126° C.

The thermoset epoxy resin plate obtained In the above-described procedure was broken into particles which were passed through a sieve of 80 mesh to obtain a minus sieve fraction of epoxy resin particles. This fraction of epoxy resin particles (80 g) was charged into a flask, and 20 g of xylylenediamine (boiling point: 160° C.–) was added to the epoxy resin particles to mix them. The mixture was heated at 150° C. for one hour while stirring. Then the decomposition of the epoxy resin progressed with time, and, as a result, a highly viscous liquid was obtained.

A 50 g portion of the liquid obtained above was placed into a dish. To this liquid added was 50 g of a bisphenol A epoxy prepolymer (manufactured by Yuka Shell Epoxy Co. and sold by the trade name of EP828), and these were mixed sufficiently, followed by heating the mixture at 80° C. for 20 minutes. As a result, the liquid in the dish had been solidified. The glass transition temperature of this solidified material was measured by the DSC, and the result of measurement was then 108° C. The solidified material exhibited complete hardening and resinification.

Example 4

To 300 g of bisphenol A epoxy prepolymer (manufactured by Chiba Geigy Co. and sold by the trade name of CT200) added were 90 g of a hardener (manufactured by Chiba Geigy Co. and sold by the trade name of HT903) for phthalic anhydrlde and 900 g of alumina (manufactured by Taiheiyo Random K.K. and sold by the trade name of LA1200) as filler, and the mixture was heated at 150° C. for 15 hours for conducting hardening to produce a thermoset epoxy resin plate having a thickness of 2 mm. The glass transition temperature of this epoxy resin plate was measured by the DSC, and the result was 104° C.

The thermoset epoxy resin plate obtained in the above-described procedure was broken into particles which were passed through a sieve of 80 mesh to obtain a minus sieve fraction of epoxy resin particles. This fraction of epoxy resin particles (1000 g) was charged into a Henschel mixer, and 20 g of xylylenediamine (boiling point: 160° C.–) was added to the epoxy resin particles to mix them. The mixture was left for 1 day at room temperature and then subjected to observation by a microscope. As a result, it was found that the surface of the epoxy resin particles had got rough- which meant partial progressing of the decomposition at only the surface of the epoxy resin.

To the resin mixture described above (containing 1000 g of partially decomposed resin and 20 g of xylylenediamine) added were 100 g of a biphenyl epoxy prepolymer (manufactured by Yuka Shell Epoxy Co. and sold by the trade name of YX4000), 100 g of a glass chopped strand having a length of 3 mm, 3 g of a carbon coloring agent and 3 g of carnauba wax, and these components were mixed in a Henschel mixer for 2 minutes. Thus obtained mixture was charged into a metal mold and compression-molded at 100 for 5 minutes to produce a molded article. The glass transition temperature of the molded article obtained above was measured by the DSC and the result of measurement was 90° C. The molded article exhibited complete hardening.

Example 5

A waste material of a heat-insulating material for refrigerators which was made of a polyurethane resin was broken into particles having a particle size of 1 mm or less. To a 100 g portion of the obtained particles added was 50 g of xylylenediamine and they were mixed at 150° for 1 hour. The decomposition of the polyurethane progressed with time, and then a liquid presenting the appearance of being transparent was obtained.

The liquid obtained above was placed into a dish. To this liquid added was 10 g of a bisphenol A epoxy prepolymer (manufactured by Yuka Shell Epoxy Co. and sold by the trade name of EP828), and these were mixed sufficiently, followed by leaving at room temperature. About 20 minutes after that, the liquid in the dish had been hardened.

Example 6

A waste material of SMC [Sheet Molding Compound) made of a unsaturated polyester was broken into particles having a particle size of 1 mm or less. To a 100 g portion of the obtained SMC particles, 100 g of xylylenediamine was added and they were stirred at 170° C. for 2 hours, to obtain a decomposed liquid. The decomposed liquid was filtered through a wire netting to remove glass fibers and fillers. Taking a 5 g portion from the filtered liquid, it was sufficiently mixed with 20 g of a bisphenol A epoxy prepolymer (trade name: EP8283, followed by leaving the mixture at room temperature. About 30 minutes after, the mixture had been hardened.

Example 7

A waste material of a semiconductor sealing resin (phenol cured epoxy resin, manufactured by Toshiba Chemical Co. of Japan and sold by the trade name of KE-300) obtained from processing thereof was broken into pieces of about 5 millimeters square. To 10 g of the obtained resin pieces, 10 g of xylylenediamine was added and the mixture was placed in a vessel which was then closed. It was heated at 400° C. for 1 hour. The vessel was then cooled to room temperature, and the contents were taken out of the vessel; and mixed with 30 g of a bisphenol A epoxy prepolymer (manufactured by Asahi Denki Kagaku Kogyo of Japan and sold by the trade name of EP-4100), followed by leaving at room temperature. As a result, the mixture was hardened to produce a mass of black-colored durable resin. The glass transition temperature of this product was measured by the DSC, and the result of measurement was 90° C.

Example 8

From a used personal computer, a printed circuit board made of epoxy resin cured by dicyanodiamide was taken out and broken into pieces of about 2 millimeters square. To 20 g of the broken pieces. 20 g of xylylenediamine was added and they were placed in a vessel which was then closed. It was heated at 400° C. for 1 hours. The vessel was then cooled to room temperature, and the contents were taken out of the vessel and filtered through a wire netting to remove the matters which had not been decomposed such as copper solid, glass fibers and solder material, to obtain a filtered liquid. Taking a 10 g portion of the filtered liquid, it was mixed with 30 g of a bisphenol A epoxy prepolymer (manufactured by Asahi Denki Kagaku Kogyo and sold by the trade name of EP-4100), followed by leaving the mixture at room temperature. As a result, the mixture was hardened to produce a mass of brown-colored resin. The glass transition temperature of this hardened material was measured by the DSC, and the result of measurement was 93° C.

Example 9

A portion of a waste FRP (Fiber glass Reinforced Plastic) ship made of a unsaturated polyester was broken into pieces of about 5 millimeters square. To a 20 g portion of the obtained FRP pieces, 20 g of xylylenediamine was added and they were placed in a vessel which was then closed. It was heated at 350° for 1 hours. The vessel was then cooled to room temperature, and the contents were taken out of the vessel and filtered through a wire netting of 80 mesh to remove the glass fibers, to obtain a filtered liquid. Taking a 10 g portion of the filtered liquid, it was mixed with 30 g of a bisphenol A epoxy prepolymer (manufactured by Asahi Denki Kagaku Kogyo and sold by the trade name of EP-4100), followed by leaving the mixture at room temperature. As a result, the mixture was hardened to produce a mass of dark brown-colored resin. The glass transition temperature of this hardened material was measured by the DSC, and the result of measurement was 98° C.

Example 10

A waste material of a heat-insulating material for refrigerators which was made of a polyurethane resin was broken into pieces of about 5 millimeters square. A 20 g portion of the obtained pieces and 10 g of xylylenediamine were placed in a flask and stirred for 1 hour, while heating to 200° C.

The decomposition liquid obtained above was cooled to room temperature. A 10 g portion of this liquid was mixed with 10 g of a bisphenol A epoxy prepolymer (manufactured by Asahi Denki Kagaku Kogyo and sold by the trade name of EP-4100), and the mixture was heated at 120° C. for 5 hours. As a result, the mixture was hardened to produce a rubberlike hard matter. The glass transition temperature of the hard matter was measured by the DSC, and the result of measurement was −5° C.

As described above, the recycling method of the present invention is a method in which a thermoset resin material which has been once hardened is plasticized before it is hardened again and subjected to molding processing, to enable the reuse of the thermoset resin material as a new product, and the industrial value thereof is extremely high.

This application is based on Japanese patent application JP-11-259596, filed in the Japanese Patent Office on Sep. 13, 1999, the entire contents of which are hereby incorporated by reference.

It must be understood that the invention is in no way limited to the above embodiments and that many changes may be brought about therein without departing from the scope of the invention as defined by the appended claims.

What is claimed is:

1. A method of recycling a thermoset resin selected from the group consisting of epoxy resins, phenol resins, melamine resins, silicone resins, urea resins, xylene resins, furan resins, melaminephenol resins and polybutadiene resins, comprising:

contacting at least a portion of the thermoset resin with decomposer having at least one functional group capable of reacting at a crosslink site on the thermoset resin, under conditions sufficient to break said crosslink site, to give a fluid thermoset preresin, wherein a plurality of chain ends of said preresin have functional groups thereon; and re-hardening said fluid thermoset preresin by reacting said plurality of chain ends with a rehardener having two or more groups reactive with said chain end functional groups.

2. The method of claim 1, wherein the rehardener is a compound having at least two epoxy groups.

3. A recycled thermoset resin prepared from a thermoset resin selected from the group consisting of epoxy reins, phenol resins, melamine resins, silicone resins, urea resins, xylene resins, furan resins, melaminephenol resins and polybutadiene resins, by a process comprising:

contacting at least a portion of the thermoset resin with a decomposer having at least one functional group capable of reacting at a crosslink site on the thermoset resin, under conditions sufficient to break said crosslink site, to give a fluid thermoset preresin, wherein a plurality of chain ends of said preresin have functional groups thereon; and re-hardening said fluid thermoset preresin by reacting said plurality of chain ends with a rehardener having two or more groups reactive with said chain end functional groups, to provide the recycled thermoset resin.

4. The method of claim 1, wherein the thermoset resin to be recycled is an acid anhydride cured epoxy resin.

5. The method of claim 1, wherein the rehardener is a liquid compound having a boiling point not lower than a glass transition temperature of the thermoset resin to be recycled.

6. The method of claim 1, wherein said at least a portion of the thermoset resin is an exterior surface of the thermoset resin and said fluid thermoset preresin is formed only on said exterior surface of the thermoset resin.

7. The method of claim 1, further comprising:

prior to said contacting step, breaking the thermoset resin into particles.

8. The method of claim 7, wherein said particles have a particle size of about 2 mm or more.

9. The method of claim 1, wherein only a portion of the crosslinking sites are broken by controlling an amount of decomposer added to said contacting step.

10. The method of claim 1, wherein the contacting step is performed at a temperature not lower than a glass transition temperature of the thermoset resin.

11. The method of claim 1, wherein said decomposer is a member selected from the group consisting of monoamines, diamines, triamines, polyamines, alcohols, diols, triols, polyols and alcoholamines.

12. The method of claim 11, wherein said decomposer is a member selected from the group consisting of benzyldimethylamine, ethylenediamine, diethylenetriamine, dipropylenetriamine, triethylenetetramine, tetraethylenepentamine, hexamethylenediamine, trimethylhexamethylenediamine, bis-(hexamethylene)triamine, polyoxypropylenediamine, 3,3'-dimethyl-4,4'-diaminodicyclohexylmethane, 4,4'-diaminodicyclohexylmethane, isophoronediamine, 1,3-bis(aminomethyl)cyclohexane, N-dimethylcyclohexylamine, xylylenediamine, benzyldimethylamine, 2-(dimethylaminomethyl)phenol, 2,4,6-tris(dimethylaminomethyl)phenol, triethanolamine, ethylene glycol, propylene glycol, butylene glycol, pyridine and imidazole.

13. The method of claim 12, wherein the decomposer is a member selected from the group consisting of diethylenetriamine, triethylenetetramine and xylylenediamine.

14. The method of claim 1, wherein the rehardener is an epoxy prepolymer.

15. The method of claim 14, wherein the epoxy prepolymer is a member selected from the group consisting of bisphenol A epoxy resins, bisphenol F epoxy resins, bisphenol AD epoxy resins, biphenyl epoxy resins, alicyclic epoxy resins, cresol novolak epoxy resins and polyfunctional epoxy resins.

16. The method of claim 2, wherein the rehardener is added in an amount sufficient to provide a ratio of epoxy equivalents in said rehardener to amount of decomposer of from 0.6 to 1.1.

17. The method of claim 1, further comprising:
between said contacting step and said rehardening step, removing solid matter from the fluid thermoset preresin.

18. The method of claim 1, further comprising:
performing said rehardening step in a mold to provide a molded reclaimed resin article.

19. A method of recycling a thermoset resin selected from the group consisting of epoxy resins, phenol resins, melamine resins, silicone resins, urea resins, xylene resins, furan resins, melaminephenol resins and polybutadiene resins, comprising:
contacting at least a portion of the thermoset resin with a decomposer having at least one amino group capable of reacting at a crosslink site on the thermoset resin, under conditions sufficient to break said crosslink site, to give a fluid thermoset preresin, wherein a plurality of chain ends of said preresin have functional groups thereon; and
re-hardening said fluid thermoset preresin by reacting said plurality of chain ends with a rehardener having two or more groups reactive with said chain end functional groups.

20. The method of claim 19, wherein the rehardener is a compound having at least two epoxy groups.

21. The method of claim 19, further comprising:
performing said rehardening step in a mold to provide a molded reclaimed resin article.

22. The method of claim 19, wherein the thermoset resin to be recycled is an acid anhydride cured epoxy resin.

23. The method of claim 19, wherein the rehardener is a liquid compound having a boiling point not lower than a glass transition temperature of the thermoset resin to be recycled.

24. The method of claim 19, wherein said at least a portion of the thermoset resin is an exterior surface of the thermoset resin and said fluid thermoset preresin is formed only on said exterior surface of the thermoset resin.

25. The method of claim 19, further comprising:
prior to said contacting step, breaking the thermoset resin into particles.

26. The method of claim 25, wherein said particles have a particle size of about 0.05 mm or more.

27. The method of claim 19, wherein only a portion of the crosslinking sites are broken by controlling an amount of decomposer added to said contacting step.

28. The method of claim 19, wherein the contacting step is performed at a temperature not lower than a glass transition temperature of the thermoset resin.

29. The method of claim 19, wherein said decomposer is a member selected from the group consisting of monoamines, diamines, triamines, polyamines, and alcoholamines.

30. The method of claim 29, wherein said decomposer is a member selected from the group consisting of benzyldimethylamine, ethylenediamine, diethylenetriamine, dipropylenetriamine, triethylenetetramine, tetraethylenepentamine, hexamethylenediamine, trimethylhexamethylenediamine, bis-(hexamethylene) triamine, polyoxypropylenediamine, 3,3'-dimethyl-4,4'-diaminodicyclohexylmethane, 4,4'-diaminodicyclehexylmethane, isophoronediamine, 1,3-bis (aminomethyl)cyclohexane, N-dimethylcyclohexylamine, xylylenediamine, benzyldimethylamine, 2-(dimethylaminomethyl)phenol, 2,4,6-tris (dimethylaminomethyl)phenol, triethanolamine, pyridine and imidazole.

31. The method of claim 19, wherein the rehardener is an epoxy prepolymer.

32. The method of claim 31, wherein the epoxy prepolymer is a member selected from the group consisting of bisphenol A epoxy resins, bisphenol F epoxy resins, bisphenol AD epoxy resins, biphenyl epoxy resins, alicyclic epoxy resins, cresol novolak epoxy resins and polyfunctional epoxy resins.

33. The method of claim 20, wherein the rehardener is added in an amount sufficient to provide a ratio of epoxy equivalents in said rehardener to amount of decomposer of from 0.6 to 1.1.

34. The method of claim 19, further comprising:
between said contacting step and said rehardening step, removing solid matter from the fluid thermoset preresin.

* * * * *

UNITED STATES PATENT AND TRADEMARK OFFICE
CERTIFICATE OF CORRECTION

PATENT NO.    : 6,465,531 B1                                          Page 1 of 1
DATED         : October 15, 2002
INVENTOR(S)   : Thai et al.

It is certified that error appears in the above-identified patent and that said Letters Patent is hereby corrected as shown below:

<u>Title page,</u>
Item [30], Foreign Application Priority Data, should read :
--     [30]          Foreign Application Priority Data
       Sep. 13, 1999   (JP) ……………………….. 11-259596 --
Item [75], the Inventor information should read:
-- [75] Inventors:    Cao Minh Thai; Takeshi Gotanda,
                      both of Yokohama (JP); Ken
                      Tsuda, Tokyo (JP) --

Signed and Sealed this

Eighteenth Day of February, 2003

JAMES E. ROGAN
*Director of the United States Patent and Trademark Office*